May 10, 1966  O. J. KEMMERER  3,250,412
LOG HANDLING APPARATUS
Filed Dec. 28, 1964  2 Sheets-Sheet 1
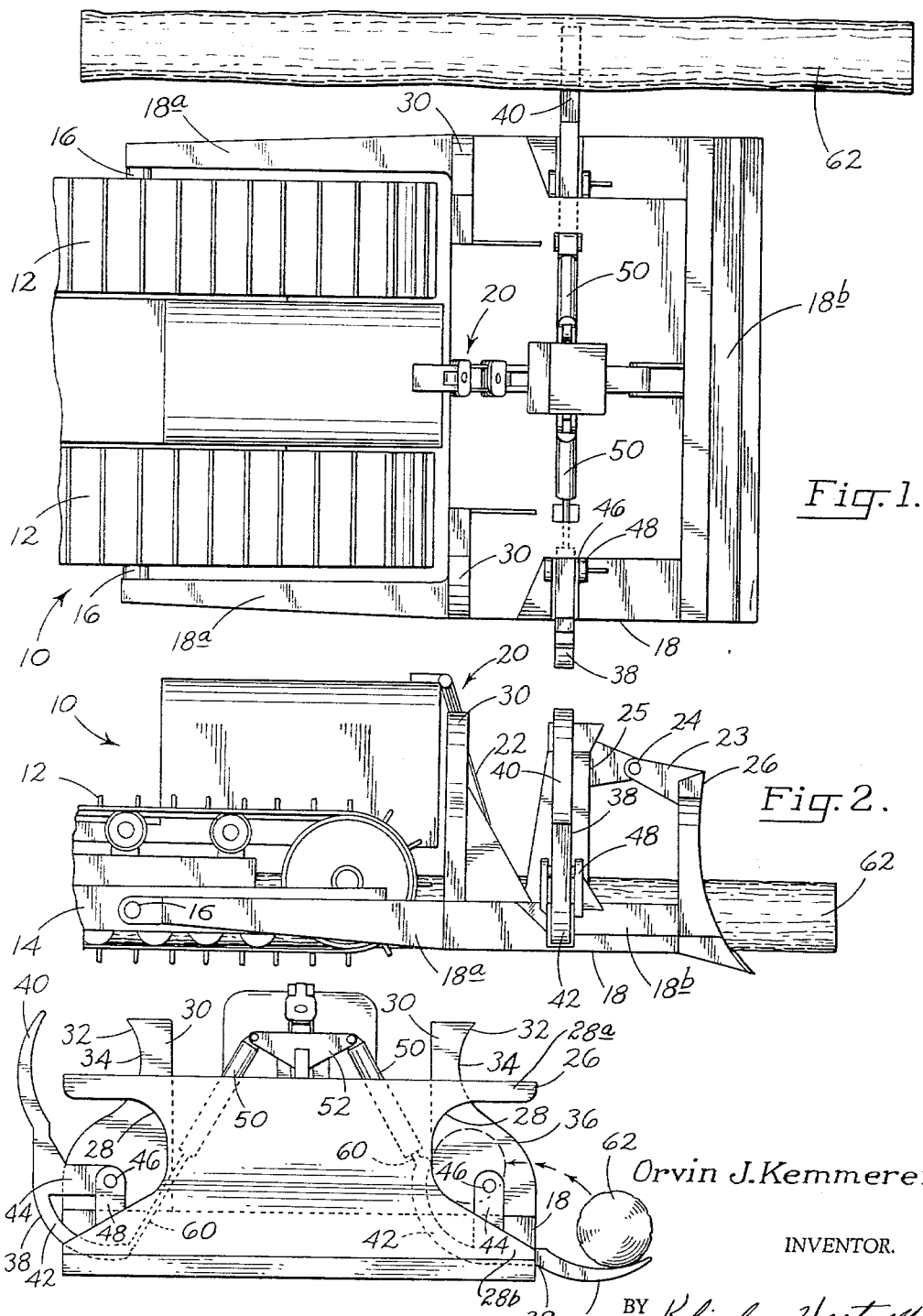

May 10, 1966   O. J. KEMMERER   3,250,412

LOG HANDLING APPARATUS

Filed Dec. 28, 1964   2 Sheets-Sheet 2

Orvin J. Kemmerer
INVENTOR.

BY Kolisch & Hartwell
Attys.

United States Patent Office 3,250,412
Patented May 10, 1966

3,250,412
LOG HANDLING APPARATUS
Orvin J. Kemmerer, P.O. Box 1127, Pendleton, Oreg.
Filed Dec. 28, 1964, Ser. No. 421,472
10 Claims. (Cl. 214—147)

This invention relates to handling apparatus for logs, poles, and the like, and more particularly to apparatus adapted to be used with a vehicle, for lifting and then transporting logs.

In the usual logging operation, cut logs are moved by tying them behind a vehicle, such as a crawler tractor, with a choker chain or line, and dragging them over the ground away from the cutting area. Although this method is relatively simple, it has several disadvantages. It is inefficient and unnecessarily costly, because of the amount of time required to connect and disconnect the lines or cables used to attach onto a log, and because of the need usually for men other than the tractor operator to handle the lines. In addition to generating these extra expenses, the method causes a great deal of destruction to the forest floor developing tree growth, and thus in many logging regions, may violate conservation regulations designed to protect new growth. Further, when dragging a log over the ground, problems are encountered in properly maneuvering the log and tractor.

Thus, a general object of this invention is to provide novel means for lifting and transporting logs and the like above the ground.

A related object is to provide such means which comprises the combination of a vehicle, such as a tractor, and mechanism for picking up and holding a log.

More particularly, it is an object of this invention to provide novel cradling means along the side of a vehicle to be used in conjunction with a powered lifting arm, whereby logs lying on the ground may be lifted by the arm and held in the cradling means in condition to be transported by the vehicle.

The invention features a pair of cradles with laterally outwardly facing mouths on at least one and preferably on both sides of a vehicle such as a tractor, and a cooperating lifting arm for each pair of cradles operable to raise logs toward and then position them in the cradle mouths.

Yet another object of the invention is to provide a unique cradling means for a vehicle characterized by a pair of spaced cradles and a shoulder cooperating with one cradle facilitating final placement of a log in both of the cradles.

In a preferred embodiment, the cradling means contemplated, and powered arm used to position a log in the cradling means, are mounted on a pivoted tractor C-frame, whereby the cradling means and arm are raised together to elevate a log lodged in the cradling means.

Other objects and advantages of the invention will become apparent from a reading of the following description, and with reference to the accompanying drawings, wherein:

FIG. 1 shows a plan view of an embodiment of this invention, comprising a crawler tractor, a C-frame extending forwardly of the tractor, and means on the C-frame for lifting and holding a log;

FIG. 2 is a side-elevational view of the unit shown in FIG. 1;

FIG. 3 is a front-elevational view of the tractor illustrated in FIGS. 1 and 2, showing cradling members and lifting arms featured in the invention;

Figure 4:
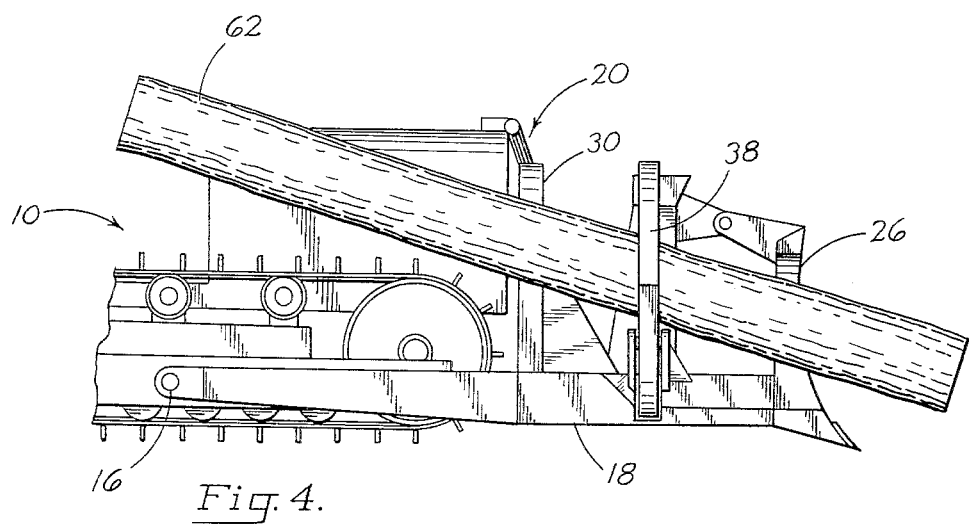
FIG. 4 is a side-elevational view of the tractor and C-frame, showing the position of a log after it has been lodged into cradles on the side of the tractor.

Referring now to the drawings, and first of all more particularly to FIGS. 1–3, a vehicle, more specifically a crawler tractor of conventional construction, is indicated generally at 10, having the usual crawler treads 12 which support the tractor for movement over the ground. The tractor includes a pair of mounting plates 14 adjacent the treads, forming part of the frame of the tractor, one being provided on each side of the tractor.

Straddling the front of the tractor, and journaled on the mounting plates, at 16, is a movable C-frame 18. The C-frame comprises a pair of arms 18a extending forwardly from journals 16 along the sides of the tractor, and a center portion 18b joining the arms at the front of the tractor. The journal connections at 16 allow the C-frame to be raised or lowered (by raising and lowering the front end of the C-frame), and to accomplish this movement, powered means in the form of hoist mechanism 20 is provided, including a cable 22 operatively connected to the center forward portion of the C-frame.

Secured to center portion 18b of the C-frame, is a blade 26 extending transversely of the tractor. In the specific embodiment herein described, a blade is shown as such has utility in a logging operation, as a means for moving logs and clearing an area. It should be apparent, however, that other constructions than a blade may be preferable in some operations. At opposite ends the blade is cut out or recessed, as at 28, so that cradles are presented at the front of the vehicle, on either side of the vehicle. Each cradle has a substantially U-shaped mouth, defined by spaced apart upper and lower laterally outwardly extending lip portions 28a, 28b, which mouth faces laterally outwardly of the vehicle, and is adapted to receive and then hold the forward portion of a log.

Positioned on the C-frame rearwardly of blade 26, and secured to each side of the C-frame, is a cradling member 30. This member, which rises upwardly from the C-frame, has a substantially S-shaped outer edge 32. The upper portion of this edge defines in member 30 the laterally outwardly facing mouth of a cradle 34 which is somewhat higher on the C-frame but substantially in longitudinal alignment with a cradle presented by blade 26. Immediately below the mouth, the edge defines a rounded shoulder 36. Each member 30 cooperates with the cradle directly in front of it formed in the blade to receive and hold a log with such disposed above the ground. The shoulder portions described function to guide logs into the mouths of the cradles directly above the shoulders.

Positioned on each side of the C-frame, intermediate the blade and the cradling member behind it, is a lifting arm 38. Each arm has a curved outer end 40, a curved inner end portion 42, and a mounting portion 44 intermediate the ends of the arm. The mounting portion of the arm is pivoted at 46 to a bracket 48, which is secured to the C-frame.

FIG. 3 of the drawings illustrates different positions for the lifting arms. The arm at the right-hand side of the figure is positioned with its outer end portion substantially horizontal and protruding laterally outwardly from the C-frame immediately above the ground. In this outwardly protruding or lowered position, the arm is adapted to be slipped under a log lying on the ground adjacent the tractor. To lift the log from the ground, the arm is pivoted about its connection 46, whereby its outer end portion is swung in an arc upwardly and inwardly toward the C-frame, until it reaches a substantially vertical position, as shown the arm at the left-hand side of FIG. 3. It will be noted that with an arm in its upright position, the outer end portion thereof in effect closes off the mouths of the cradles on the same side of the C-frame as the arm, viewing the cradles in a direction extending longitudinally of the tractor. Thus, a log lifted by an arm is held lodged in a pair of cradles by the arm with the arm upright.

Movement of the arms is produced by a pair of power-operated rams 50, pivotally interconnected between inner end portions 42 of the arms and a central bracket 52 secured to the C-frame through post 25. Because of the inclusion of end portion 42 in each arm, the piston rod 60 of the ram connected to the arm swings in a lateral direction only slightly on extension of the ram. The rod stays clear of the region extending longitudinally of the tractor and defined by the mouths of the cradles which is provided to receive a log. Note also that pivot connection 46 for an arm is to one side of this region.

The position of the C-frame prior to the lifting of a log for carrying purposes is the lowered position shown in FIGS. 2 and 3 of the drawings, with the frame being substantially horizontal and directly above the ground. As already indicated, when the frame is in this position, the cradles presented by the blade are lower to the ground than the cradles provided rearwardly on the C-frame. Assuming that the frame is in this lowered position, operation of the apparatus of this invention will be described.

Figure 5:
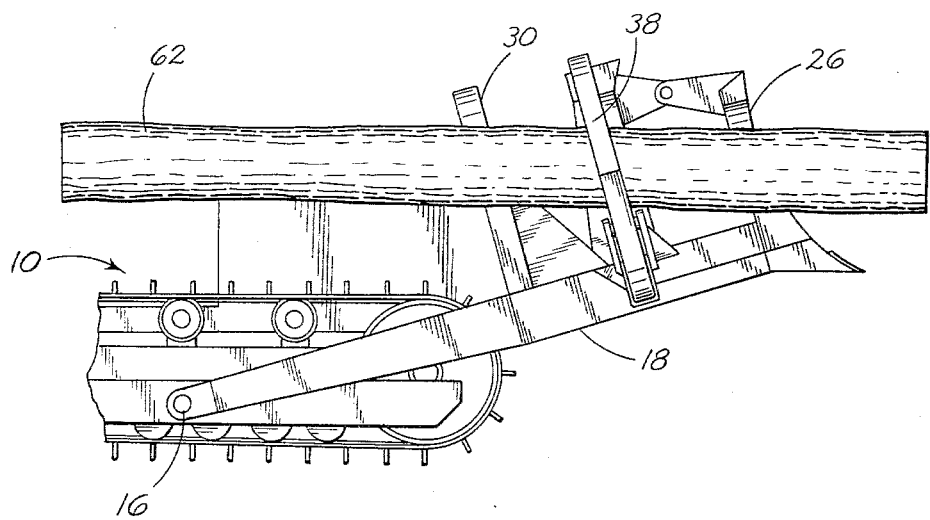
FIG. 5 is similar to FIG. 4, but shows the log raised to substantially a horizontal position by raising of the C-frame on the tractor.

A log to be moved is indicated at 62, and initially this log lies adjacent the ground beside the tractor. The first step in handling the log is to shift the outer end portion of an arm beneath a forward part of the log, as shown in FIGS. 1, 2, and 3. This may be done through suitable maneuvering of the tractor. The arm is then raised by operation of the ram connected to it, and as the arm swings upwardly, the forward end of the log swings into a cradle presented by an end of the blade. As swinging of the arm continues, the cradle at the end of the blade functions as a fulcrum for the log, and the log is heeled with the rear of the log then rising and sliding over the rounded shoulder of a cradle member 30, until it finally is directed into the cradle of this cradling member. During heeling of the log, the shoulder provides protection for the tractor. When the arm reaches an upright position, the log will be held tightly by the arm in cradles spaced from each other along the length of the log, as shown in FIG. 4 of the drawings. Before raising of the C-frame, the log will be inclined, with its forward end lower than its rear end, due to the difference in elevations of the cradles. With the log tightly held in the cradles, the C-frame may be elevated to the position shown in FIG. 5, with the log then assuming substantially horizontal position, where slippage out of the cradles is inhibited. The log now is held along-side the tractor above the ground, ready to be carried by the tractor.

While a specific embodiment has been shown and described, it is not intended by this discussion to be limited strictly to the embodiment shown. It should be apparent to those skilled in the art that modifications are possible without departing from the principles of the invention, and it is desired to cover all such variations as come within the scope of the appended claims.

It is claimed and desired to secure by Letters Patent:

1. Equipment for transporting logs and the like comprising
   a vehicle,
   a movable C-frame, with legs journaled to opposite side of the vehicle and extending forwardly therefrom to a center portion disposed in front of the vehicle,
   powered means interposed between said frame and said vehicle adapted to raise said center portion of the frame, by pivoting the frame on its journals,
   cradling means on at least one side of said vehicle adapted to receive a log comprising a pair of spaced-apart cradles secured to said one side of said C-frame, said cradles being positioned with one forwardly of the other, and each having a laterally outwardly facing mouth adapted to receive a log,
   the mouth of said forwardly positioned cradle being lower on said frame than the mouth of said rearwardly positioned cradle, said rearwardly positioned cradle having below its mouth a rounded shoulder integral functioning to direct a log into its mouth,
   a lifting arm pivoted to said frame between said cradles having an outer end disposed laterally outwardly of the cradles and lying adjacent the ground, said arm being pivotable to an upright position and in this position being operable to close off said cradle mouths viewing the cardles in a direction extending longitudinally of the vehicle, and
   powered means interposed between said C-frame and said lifting arm adapted to pivot said arm into its upright position whereby a log lying on the ground adjacent said vehicle may be lifted by said lifting arm into said cradling mouths and held therein by said arm.

2. The vehicle of claim 1, wherein the mouths of the cradles define a load-holding region extending between the mouths and viewing the mouths in a direction extending longitudinally of the vehicle, which is to one side of the pivot axis of the lifting arm.

3. Equipment for transporting logs and the like comprising
   a vehicle,
   a movable C-frame, with legs straddling the vehicle and journaled to the same,
   powered means interposed between said C-frame and said vehicle adapted to raise said C-frame by pivoting the frame,
   cradling means on at least one side of said vehicle comprising a pair of longitudinally spaced-apart cradles secured to said frame, each having a mouth facing laterally outwardly of said vehicle adapted to receive a log,
   a lifting arm pivoted to said frame protruding laterally outwardly from the vehicle intermediate said cradles, and
   powered means interposed between said C-frame and said lifting arm adapted to pivot said lifting arm, whereby the same assumes an upright position adjacent the mouths of said cradles.

4. Log handling apparatus comprising
   a vehicle,
   a power-operated C-frame having legs journaled to a pair of spaced-apart cradles secured to said frame on said vehicle, operable to be raised or lowered,
   at least one side of said vehicle, each of said cradles having a laterally outwardly facing mouth therein adapted to receive a log,
   and a lifting arm intermediate said cradles, operable to engage a log lying adjacent said vehicle and to lift the same into said mouths of said cradles whereby the log may be transported by said vehicle.

5. Log handling apparatus comprising
   a vehicle,
   cradling means for said vehicle whereby a log may be held for carrying along the side thereof, said means comprising a pair of cradles with laterally outwardly facing mouths positioned on at least one side of said vehicle, said cradles being spaced from each other in a direction extending longitudinally of the vehicle, and
   a power-operated lifting arm intermediate said cradles adapted to lift a log into said mouths.

6. Log handling apparatus comprising
   a vehicle,
   a cradle mounted on the vehicle, said cradle having upper and lower laterally outwardly extending lip portions defining a laterally outwardly facing mouth.
   and a lifting arm protruding laterally outwardly of said one side of the vehicle below the mouth of said cradle, said lifting arm being adapted to lift a log lying adjacent said vehicle between said lip portions and into said mouth wherein the same may be held for transporting on said vehicle.

7. Log handling apparatus comprising,
a vehicle,
a movable C-frame with legs journaled on opposite sides of said vehicle and extending forwardly therefrom to a center portion disposed forwardly of the vehicle,
an elongated blade disposed transversely of the vehicle secured adjacent the front of said center portion, said blade being recessed at opposite ends whereby opposed cradles with laterally outwardly facing mouths are formed adapted to receive logs and the like,
a pair of cradles secured to said C-frame on opposite sides of the vehicle behind said blade, each having a laterally outwardly facing mouth adapted to receive a log, and a rounded shoulder portion below each of said last-mentioned cradles adapted to direct a log into the mouths of the cradles,
lifting arms on opposite sides of the vehicle pivoted to said C-frame, between said blade and the cradles behind said blade,
powered means interposed between said C-frame and said lifting arms adapted to pivot said arms whereby logs lying on the ground adjacent a side of said vehicle may be lifted by one of said lifting arms into the mouths of cradles on such side of the vehicle and then held by the arm in the cradles, and powered means for raising said C-frame.

8. Load handling means comprising
a C-frame with opposed legs and a center portion joining the legs,
a pair of cradles formed in opposite ends of said blade, respectively,
a blade mounted on said center portion extending transversely of said legs
a pair of cradles on said C-frame, behind said blade, and each in substantial longitudinal alignment with one of the cradles formed in an end of said blade, and
means for holding a log and the like with such lodged in one of the cradles on said C-frame and the cradle formed in one end of a blade which is aligned therewith.

9. The apparatus of claim 5, which further comprises a frame movably mounted on the vehicle, and wherein said cradling means and lifting arm are mounted on said frame for movement with the frame.

10. The vehicle of claim 5, which further comprises a shoulder below one cradle for guiding a log into the cradle on the log being lifted by the lifting arm.

References Cited by the Examiner

UNITED STATES PATENTS

| | | | |
|---|---|---|---|
| 2,635,884 | 4/1953 | Christiansen | 214—78 X |
| 3,021,021 | 2/1962 | Warren | 214—80 X |

FOREIGN PATENTS

| | | |
|---|---|---|
| 1,278,388 | 10/1961 | France. |

HUGO O. SCHULZ, *Primary Examiner.*